United States Patent
Deng et al.

(10) Patent No.: US 9,916,837 B2
(45) Date of Patent: Mar. 13, 2018

(54) METHODS AND APPARATUSES FOR TRANSMITTING AND RECEIVING AUDIO SIGNALS

(71) Applicant: DOLBY LABORATORIES LICENSING CORPORATION, San Francisco, CA (US)

(72) Inventors: Huiqun Deng, Beijing (CN); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 381 days.

(21) Appl. No.: 14/384,644

(22) PCT Filed: Mar. 21, 2013

(86) PCT No.: PCT/US2013/033369
§ 371 (c)(1),
(2) Date: Sep. 11, 2014

(87) PCT Pub. No.: WO2013/142730
PCT Pub. Date: Sep. 26, 2013

(65) Prior Publication Data
US 2015/0036679 A1    Feb. 5, 2015

Related U.S. Application Data

(60) Provisional application No. 61/619,191, filed on Apr. 2, 2012.

(30) Foreign Application Priority Data

Mar. 23, 2012    (CN) .......................... 2012 1 0080895

(51) Int. Cl.
G10L 19/16    (2013.01)
H04L 29/06    (2006.01)
(Continued)

(52) U.S. Cl.
CPC .......... *G10L 19/167* (2013.01); *H04L 65/602* (2013.01); *H04L 65/607* (2013.01); *G10L 19/005* (2013.01); *G10L 19/02* (2013.01)

(58) Field of Classification Search
CPC ..... H04L 65/60; H04L 65/601; H04L 65/602; H04L 65/607; G10L 19/008; G10L 19/032; G10L 19/0208; G10L 19/167
See application file for complete search history.

(56) References Cited

U.S. PATENT DOCUMENTS 5,651,090 A    7/1997    Moriya
5,684,920 A    11/1997   Iwakami
(Continued)

FOREIGN PATENT DOCUMENTS

WO    99/50828    10/1997

OTHER PUBLICATIONS

Korhonen, J. et al., "Toward Bandwidth-Efficient and Error-Robust Audio Streaming Over Lossy Packet Networks," Multimedia Systems, Springer, Berlin, DR, vol. 10, No. 5, pp. 402-412, Aug. 1, 2005.
(Continued)

*Primary Examiner* — Hassan Kizou
*Assistant Examiner* — Roberta A Shand

(57) ABSTRACT

Methods and corresponding apparatuses for transmitting and receiving audio signals are described. A transformation is performed on the audio signals in units of frame in order to obtain transformed audio data of each frame, said transformed audio data consisting of multiple signal components in the frequency domain. These signal components of each frame are distributed into multiple adjacent packets in order to generate packets in which signal components distributed from multiple frames are interleaved. Subsequently, the generated packets are transmitted. Accordingly, in case that
(Continued)

packet loss occurs during transmission, the audio signals can be recovered based on the received signal components without consuming additional bandwidth. Therefore, robustness against packet loss can be achieved with little overhead.

9 Claims, 11 Drawing Sheets

(51) Int. Cl.
*G10L 19/02* (2013.01)
*G10L 19/005* (2013.01)

(56) References Cited

U.S. PATENT DOCUMENTS

| | | | |
|---|---|---|---|
| 5,832,443 | A | 11/1998 | Kolesnik |
| 6,813,600 | B1 | 11/2004 | Casey, III |
| 6,985,856 | B2 * | 1/2006 | Wang .............. G10L 19/005 704/226 |
| 7,283,968 | B2 | 10/2007 | Youn |
| 7,392,176 | B2 | 6/2008 | Nishio |
| 7,546,240 | B2 | 6/2009 | Mehrotra |
| 7,657,336 | B2 | 2/2010 | Rao |
| 7,693,709 | B2 | 4/2010 | Thumpudi |
| 7,844,052 | B2 | 11/2010 | Tapson |
| 7,930,185 | B2 | 4/2011 | Tsuchinaga |
| 7,979,271 | B2 | 7/2011 | Bessette |
| 7,987,089 | B2 | 7/2011 | Krishnan |
| 7,996,233 | B2 | 8/2011 | Oshikiri |
| 8,442,818 | B2 * | 5/2013 | Trainor ............... G10L 19/22 704/221 |
| 8,620,644 | B2 * | 12/2013 | Ryu ................. G10L 19/005 704/201 |
| 9,037,456 | B2 * | 5/2015 | Mittal ................ G10L 19/20 704/219 |
| 2002/0006203 | A1 * | 1/2002 | Tachibana ........... G10L 19/018 380/269 |
| 2003/0093282 | A1 * | 5/2003 | Goodwin ............ G06F 17/147 704/500 |
| 2005/0071402 | A1 * | 3/2005 | Youn ................ G10L 19/025 708/402 |
| 2005/0231396 | A1 * | 10/2005 | Dunn ................ G10L 19/24 341/50 |
| 2009/0040997 | A1 * | 2/2009 | Oh ................. H04N 21/4382 370/345 |
| 2009/0150143 | A1 | 6/2009 | Kim |
| 2010/0034219 | A1 * | 2/2010 | Stadelmeier ....... H04N 21/4385 370/478 |
| 2010/0228552 | A1 | 9/2010 | Suzuki |
| 2015/0255079 | A1 * | 9/2015 | Huang ............... G10L 19/0017 704/500 |

OTHER PUBLICATIONS

Panangadan, A. et al., "Interleaving Wavelet Coefficients for Adaptive Data Transmission for Pervasive Sensing Systems," Computer Communications and Networks (ICCCN), 2011 Proceedings of 20th International Conference on, IEEE, pp. 1-6, Jul. 31, 2011.
Perkins, C. et al., "A Survey of Packet Loss Recovery Techniques for Streaming Audio," IEEE Network, IEEE Service Center, New York, NY, US, vol. 12, No. 5, pp. 40-48, Sep. 1, 1998.

* cited by examiner

METHODS AND APPARATUSES FOR TRANSMITTING AND RECEIVING AUDIO SIGNALS

CROSS-REFERENCE TO RELATED APPLICATIONS

This application claims priority to Chinese Patent Application No. 201210080895.5, filed 23 Mar. 2012 and U.S. Patent Provisional Application No. 61/619,191, filed 2 Apr. 2012, each of which is hereby incorporated by reference in its entirety.

TECHNICAL FIELD

The present invention relates generally to audio data transmission. More specifically, embodiments of the present invention relate to methods and apparatuses for transmitting and receiving audio signals.

BACKGROUND

Audio and speech data are increasingly transported over a packet network such as the Internet with the widespread use of Voice over IP (VoIP) and audio streaming services. A main characteristic associated with the packet network is packet loss. Frequent packet losses can severely degrade speech intelligibility and audio quality.

There are various methods to recover speech or audio signals from lost packets, which broadly can be divided into two classes: sender and receiver based algorithms. Receiver-only approaches, such as G711 Appendix I, require no side information in the packet, however offer only limited performance. Sender-based techniques often employ adding redundancy at the encoder such that the extra information can be utilized at the decoder to fully or partly recover the lost packets. For example, forward error correction (FEC) is one such method that is commonly used. Unfortunately, such methods can significantly increase bandwidth consumption which is highly undesirable when network bandwidth has become more and more precious nowadays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

BRIEF DESCRIPTION OF DRAWINGS

The present invention is illustrated by way of examples, and not by way of limitation, in the figures of the accompanying drawings and in which like reference numerals refer to similar elements and in which.

DESCRIPTION OF EXAMPLE EMBODIMENTS

Figure 1:
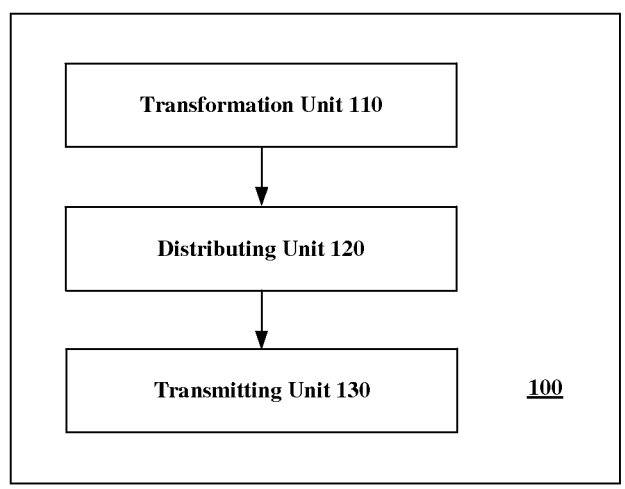
FIG. 1 is a block diagram illustrating an example apparatus for transmitting audio signals according to an embodiment of the present invention.

The embodiments of the present invention are described below by referring to the drawings. It is to be noted that, for purpose of clarity, representations and descriptions about those components and processes known by those skilled in the art but unrelated to the present invention are omitted in the drawings and the description.

As will be appreciated by one skilled in the art, aspects of the present invention may be embodied as a system (e.g., an online digital media store, cloud computing service, streaming media service, telecommunication network, or the like), device (e.g., a cellular telephone, portable media player, personal computer, television set-top box, or digital video recorder, or any media player), method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Overview

According to an embodiment of the invention, a method of transmitting audio signals is provided. The method comprises: performing transformation on the audio signals in units of frame to obtain transformed audio data of each frame, which includes multiple signal components in frequency domain; distributing the signal components of each frame into multiple adjacent packets to generate each packet in which partial signal components distributed from multiple frames are interleaved; and transmitting the generated packet.

According to an embodiment of the invention, a method of receiving audio signals is provided. The method comprises: receiving multiple packets into which signal components of a current frame are distributed; extracting the signal components of the current frame from the received packets; performing inverse transformation on the extracted signal components to reconstruct the audio signals of the current frame.

According to an embodiment of the invention, an apparatus for transmitting audio signals is provided. The apparatus comprises: a transformation unit configured to perform transformation on the audio signals in units of frame to obtain transformed audio data of each frame, which includes multiple signal components in frequency domain; a distributing unit configured to distribute the signal components of each frame into multiple adjacent packets to generate each packet in which partial signal components distributed from multiple frames are interleaved; and a transmitting unit configured to transmit the generated packet.

According to an embodiment of the invention, an apparatus for receiving audio signals is provided. The apparatus comprises: a receiving unit configured to receive multiple packets into which signal components of a current frame are distributed; an extracting unit configured to extract the signal components of the current frame from the received packets; an inverse transformation unit configured to perform inverse transformation on the extracted signal components to reconstruct the audio signals of the current frame.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

Transmitting Audio Signals

FIG. 1 is a block diagram illustrating an example apparatus for transmitting audio signals according to an embodiment of the present invention.

As illustrated in FIG. 1, the apparatus 100 includes a transformation unit 110, a distributing unit 120 and a transmitting unit 130.

The transformation unit 110 may perform transformation on audio signals, which are typically sampled in time domain, in units of frame to obtain transformed audio data of each frame, which includes multiple signal components in frequency domain. For example, the audio signals of each frame may be transformed into a set of Modified Discrete Cosine Transformation (MDCT) coefficients, which correspond to the signal components, in frequency domain by MDCT. Also, various other transformations such as Fast Fourier transform (FFT), Quadrature Mirror Filter (QMF), wavelet transform, Conjugate QMF (CQMF), etc. may be adopted here.

The distributing unit 120 may distribute the signal components of each frame into multiple adjacent packets to generate each packet in which partial signal components distributed from multiple frames are interleaved (or combined) (the distribution process is also referred to as "interleaving" and the number of the multiple adjacent packets is also referred to as "interleaving length" in the specification for the purpose of clarity). The process performed by the distributing unit 120 will be described in detail later.

The transmitting unit 130 may transmit each packet generated by the distributing unit 120 over a communication network such as a packet network, or transmit it to a storage device, such as an optical storage device, a magnetic storage device or a flash memory etc., so as to be stored therein.

According to an example implementation of the distributing unit 120, the distributing unit 120 may distribute the signal components of each frame into the multiple adjacent packets uniformly. For example, assuming that the number of the signal components of each frame is N, and the interleaving length is L, the distributing unit 120 may divide the signal components of each frame into L sets of signal components, each of which includes N/L signal components, and distribute the L sets of signal components into the L adjacent packets respectively.

According to an example implementation of the distributing unit 120, the distributing unit 120 may distribute a half of the signal components indexed by odd numbers (or even numbers) into a first packet, and distribute the other half of the signal components indexed by even numbers (or odd numbers) into a subsequent packet that follows the first packet in transmission order. It should be noted that the present invention is not limited to the above odd/even interleaving manner, and any other interleaving manner may also be adopted here as long as the transmitting side (also referred to as "encoding side") and the receiving side (also referred to as "decoding side") have agreed upon the interleaving manner in advance.

According to another example implementation of the distributing unit 120, the distributing unit 120 may perform frequency dependent interleaving. More specifically, considering that low-frequency components in speech signals are more important and change more slowly than high-frequency components, the distributing unit 120 may distribute the signal components of each frame into the multiple adjacent packets so that the low-frequency components are reserved in a corresponding one (also referred to as "the current packet", whose sequence number is the same as that of the current frame) among the multiple adjacent packets and the high-frequency components are distributed into the multiple adjacent packets. Thus, in case that packet loss occurs in transmission, the audio signals may be reconstructed using the low-frequency components from an available previous frame and the received partial high-frequency components at the decoding side.

Specific implementations of the distributing unit 120 will be described below in detail by taking MDCT and the interleaving length of 2 as examples. However, those skilled in the art should appreciate that the present invention is not limited thereto. For example, as mentioned in the above, FFT, QMF, wavelet transform, CQMF, etc may be applicable to the present invention, and the interleaving length may be 3 or more as long as more delay is allowed. Furthermore, the interleaving length may be determined dynamically according to various conditions of the communication network such as network delay, occurrence frequency of packet loss etc.

In an example implementation of the distributing unit 120, the distributing unit 120 may distribute MDCT coefficients of each frame into two adjacent packets. Thus, MDCT coefficients are interleaved across different frames before packet transmission. Specifically, the distributing unit 120 may distribute half of the MDCT coefficients of a frame in one packet and the other half of the MDCT coefficients in the following packet. In other words, a packet contains half coefficients of the current frame and half coefficients of another frame.

In order to further clarify the above process of the distributing unit 120, three examples of interleaving MDCT coefficients across two adjacent frames will be provided below.

EXAMPLE 1

Figure 2:
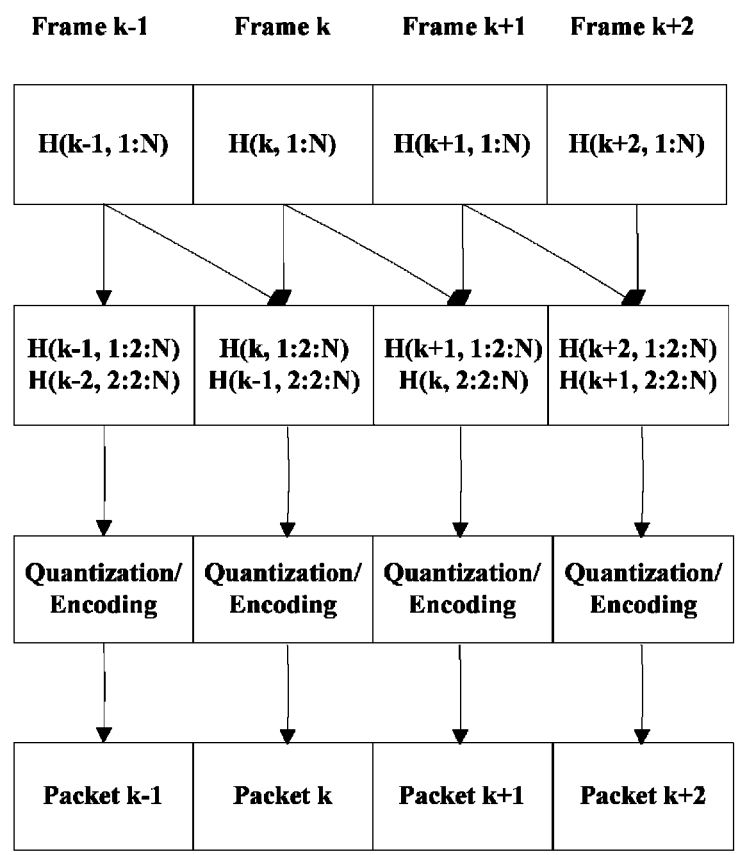
FIG. 2 is a schematic view for illustrating a first example of interleaving MDCT coefficients across two adjacent frames.

In this example, as illustrated in FIG. 2, assuming that the number of MDCT coefficients of each frame is N, and H(k, q) is the $q^{th}$ MDCT coefficient for frame k, H(k, j:p) means the sequence H(k, j), H(k, j+1), . . . H(k, p), and H(k, j:2:N) means the sequence H(k, j), H(k, j+2), H(k, j+4), . . . . H(k, N−1) or H(k, N). Then, packet k−1 contains N/2 coefficients of frame k−2 and N/2 coefficients of frame k−1; and packet k contains the other N/2 coefficients of frame k−1 and N/2 coefficients of frame k. In packet k, N/2 coefficients of frame k−1 and N/2 coefficients of frame k are interleaved. For example, the even bins of packet k may contain even bin coefficients from frame k−1. When packet k−1 is lost, half of the coefficients can be extracted from packet k to recover frame k−1.

EXAMPLE 2

Figure 3:
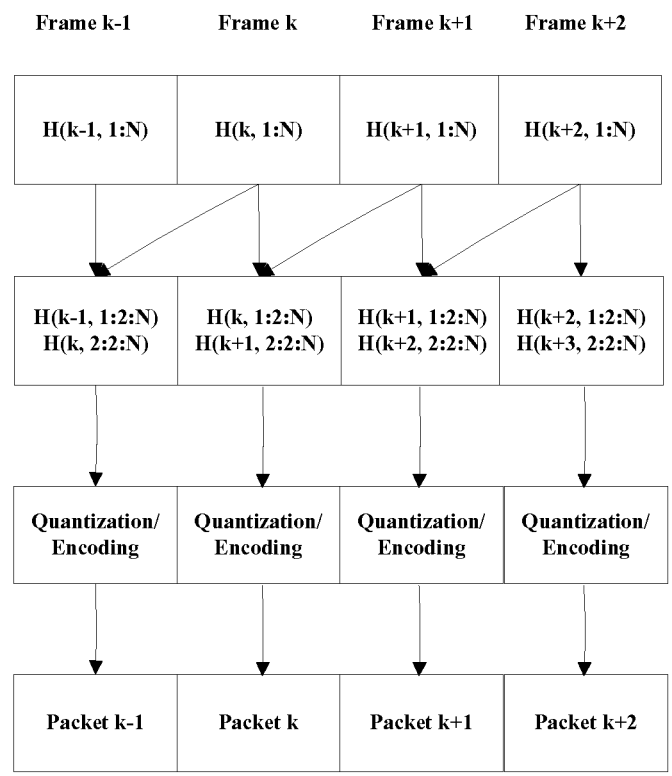
FIG. 3 is a schematic view for illustrating a second example of interleaving MDCT coefficients across two adjacent frames.

In this example, as illustrated in FIG. 3, packet k−1 contains N/2 coefficients of frame k and N/2 coefficients of frame k−1; and packet k contains N/2 coefficients of frame k+1 and the other N/2 coefficients of frame k. Different from the above example 1 where one-frame delay occurs at the decoding side, this example requires one-frame delay at the encoding side.

EXAMPLE 3

Figure 4:
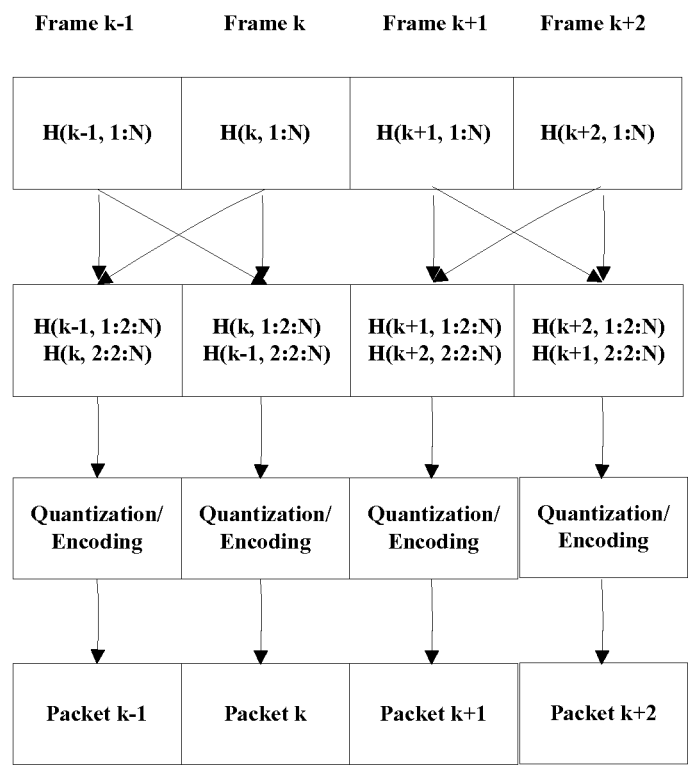
FIG. 4 is a schematic view for illustrating a third example of interleaving MDCT coefficients across two adjacent frames.

In this example, as illustrated in FIG. 4, two adjacent frames form a pair. Packet k−1 contains N/2 coefficients of frame k−1 and N/2 coefficients of frame k; and packet k contains the other N/2 coefficients of frame k−1 and the other N/2 coefficients of frame k.

In the above examples, as illustrated in FIGS. 2-4, quantization and encoding are performed after the interleaving. However, it should be noted that quantization and encoding may also be performed before the interleaving. Further, in some circumstances, it is also possible to omit the quantization and encoding.

Figure 5:
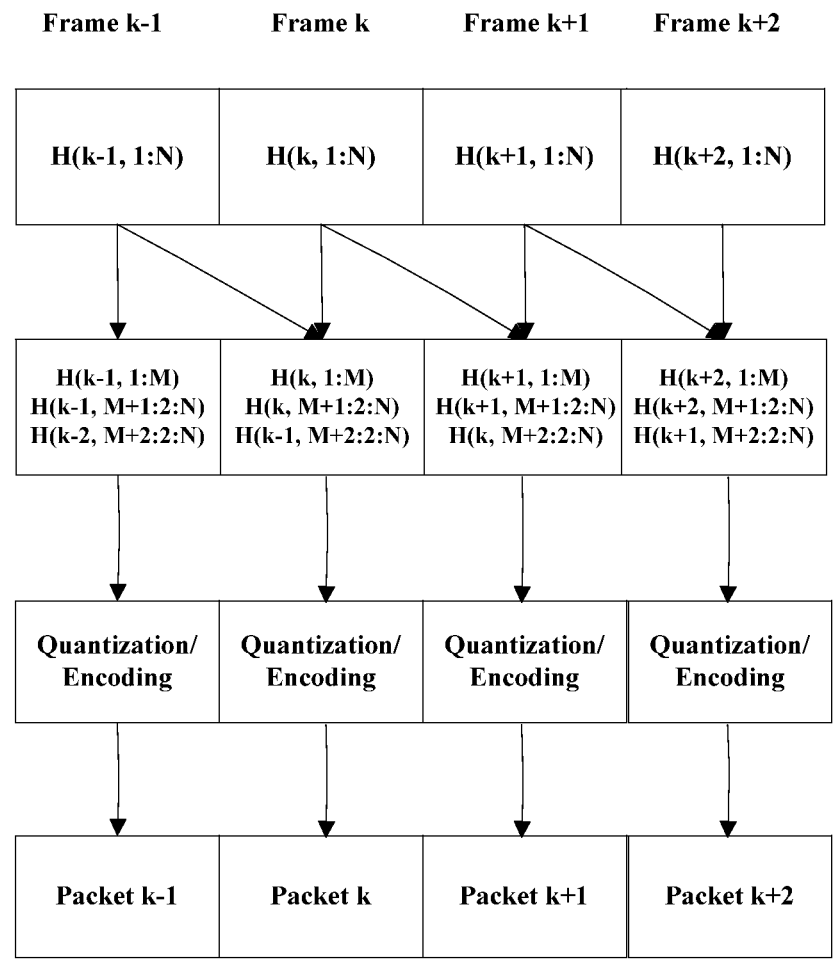
FIG. 5 is a schematic view for illustrating a fourth example of interleaving MDCT coefficients across two adjacent frames.
Figure 6:
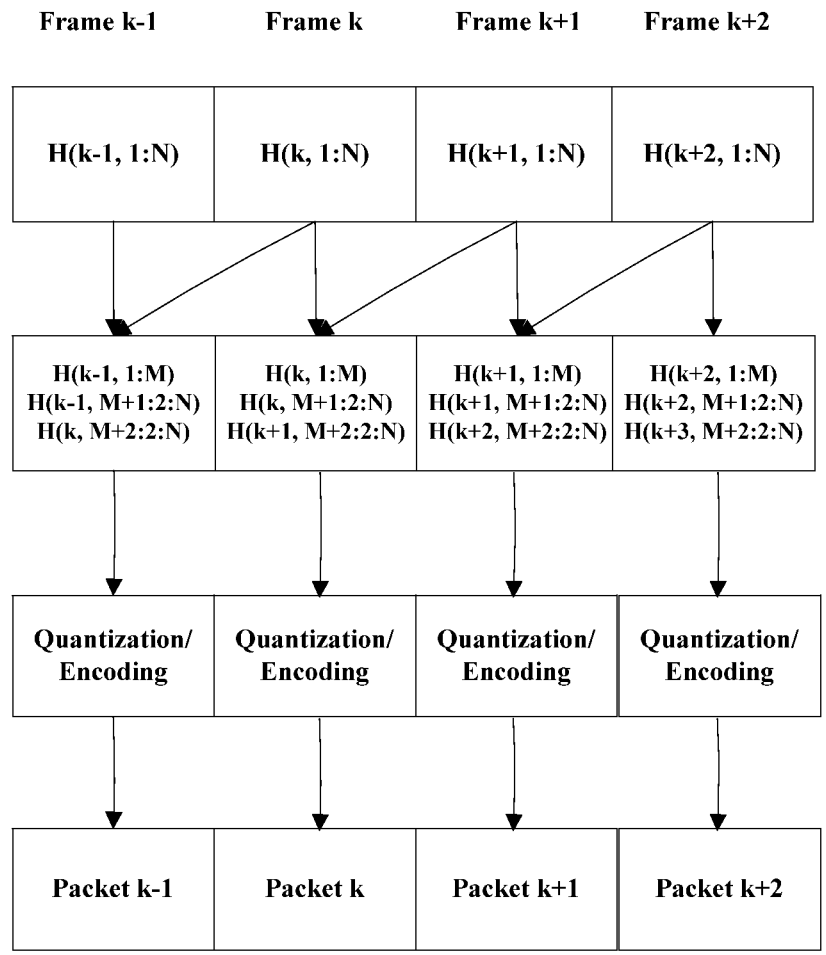
FIG. 6 is a schematic view for illustrating a fifth example of interleaving MDCT coefficients across two adjacent frames.
Figure 7:
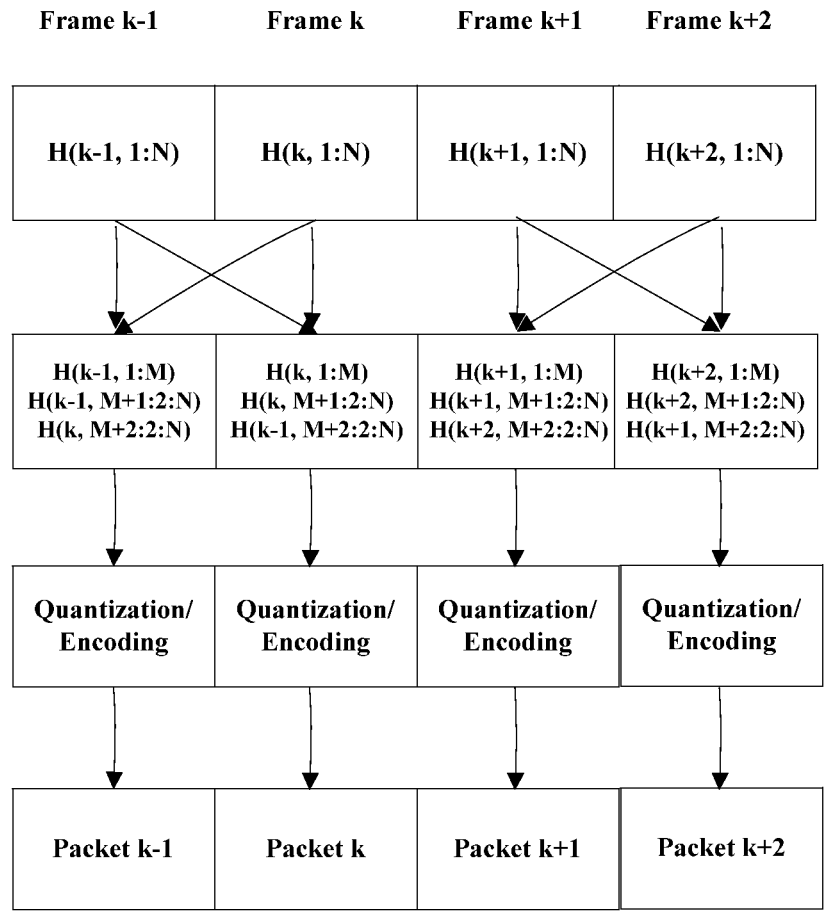
FIG. 7 is a schematic view for illustrating a sixth example of interleaving MDCT coefficients across two adjacent frames.

In another example implementation of the distributing unit 120, the distributing unit 120 may interleave high-frequency MDCT coefficients across adjacent frames, not low-frequency MDCT coefficients. Hence, a packet contains low-frequency MDCT coefficients and partial high-frequency MDCT coefficients from a frame, as well as partial high-frequency MDCT coefficients from another frame. In case one packet is lost in transmission, the audio signals may be reconstructed using the received partial high-frequency MDCT coefficients contained in another available packet at the receiving side. For example, as illustrated in the examples 4-6 of FIGS. 5-7 corresponding to examples 1-3 of FIGS. 2-4 respectively, the interleaving is done across two adjacent frames. The first M MDCT coefficients (M<N) are not interleaved across the adjacent frames; whereas, the remaining N–M MDCT coefficients higher than order M are distributed between the adjacent frames. The interleaving of the MDCT coefficients higher than order M in the examples 4-6 of FIGS. 5-7 is similar to the interleaving of MDCT coefficients in the examples 1-3 of FIGS. 2-4 respectively, and therefore repeated description thereof will be omitted here.

Receiving Audio Signals

Figure 8:
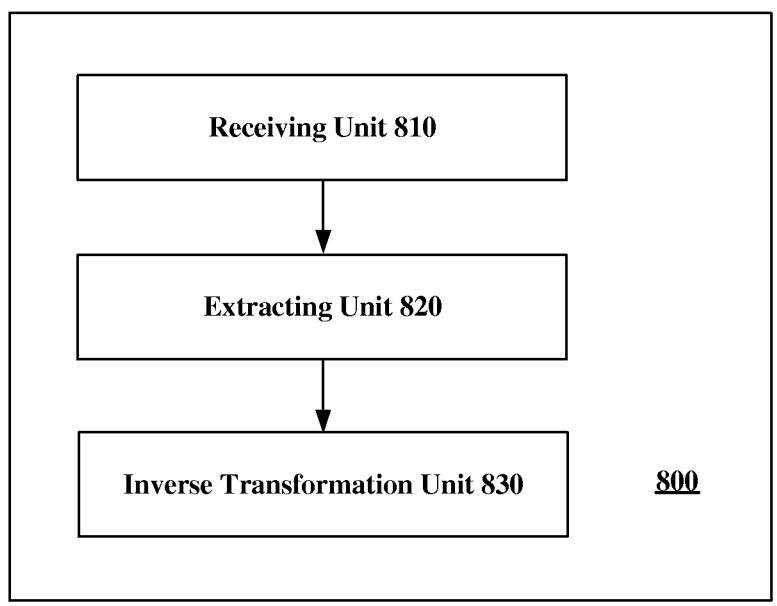
FIG. 8 is a block diagram illustrating an example apparatus for receiving audio signals according to an embodiment of the present invention.

FIG. 8 is a block diagram illustrating an example apparatus 800 for receiving audio signals according to an embodiment of the present invention, which corresponds to the example apparatus 100 for transmitting audio signals in FIG. 1.

As illustrated in FIG. 8, the apparatus 800 includes a receiving unit 810, an extracting unit 820 and an inverse transformation unit 830.

The receiving unit 810 may receive multiple packets into which signal components of a current frame are distributed, over a communication network such as a packet network, or receive them from a storage device such as an optical storage device, a magnetic storage device or a flash memory etc. The extracting unit 820 may extract the signal components of the current frame from the received packets. The inverse transformation unit 830 may perform inverse transformation on the extracted signal components to reconstruct the audio signals of the current frame.

In an example implementation of the inverse transformation unit 830, when the transformation in the transformation unit 110 in FIG. 1 is modified discrete cosine transformation (MDCT), the inverse transformation in the inverse transformation unit 830 is inverse MDCT (iMDCT) and the signal components are MDCT coefficients correspondingly. Obviously, any other inverse transformation may also be adopted here as long as the inverse transformation corresponds to the transformation in the transformation unit 110 in FIG. 1.

In an example implementation of the inverse transformation unit 830, if packet loss occurs in transmission, the inverse transformation unit 830 may fill missing signal components of the current frame by one of the following ways: filling with zero, interpolation of adjacent signal components in the current frame, interpolation of signal components in adjacent frames, repeating signal components of an available previous frame, or building a statistical model, such as a linear regression model, to predict the missing signal components.

In an example implementation of the inverse transformation unit 830, in case that the low-frequency components in the current frame are reserved in a corresponding one among the multiple packets at the transmitting side, when the corresponding packet is lost in transmission, the missing low-frequency components may be filled with low-frequency components from an available adjacent frame.

In an example implementation of the inverse transformation unit 830, based on the fact that with respect to speech signals, voiced sounds such as vowels change slowly; whereas unvoiced sounds such as unvoiced consonants have a relatively short duration and change sharply in duration, in estimating the missing low-frequency components contained in the lost packet, the speech sound type of an available adjacent frame may be considered. If the speech sound in the available adjacent frame is a voiced sound, then the missing low-frequency components for the lost frame may be filled with low-frequency components from the adjacent frame; otherwise, the missing low-frequency components for the lost frame may be filled with zeros or small values which may be predetermined.

As an example implementation of determining the speech sound type, voiced or unvoiced sound type may determined based on the comparison between the energy of the low-frequency components and the energy of the high-frequency components in the available adjacent frame. If the low-frequency energy is much larger than the high-frequency energy, then this frame is determined as voiced; otherwise this frame is determined as unvoiced. It should be noted that the present invention is not limited thereto, and any other way of determining the speech sound type may be adopted here.

In an example implementation of the extracting unit 820, decoding and inverse quantization may be performed before or after the extracting. Also, in some circumstances, it is possible to omit the decoding and inverse quantization in the extracting unit 820.

The example apparatuses for transmitting and receiving audio signals according to embodiments of the present invention have been described in detail with reference to the drawings. The example methods for transmitting and receiving audio signals according to embodiments of the present invention will be described below with reference to the drawings.

Figure 9:
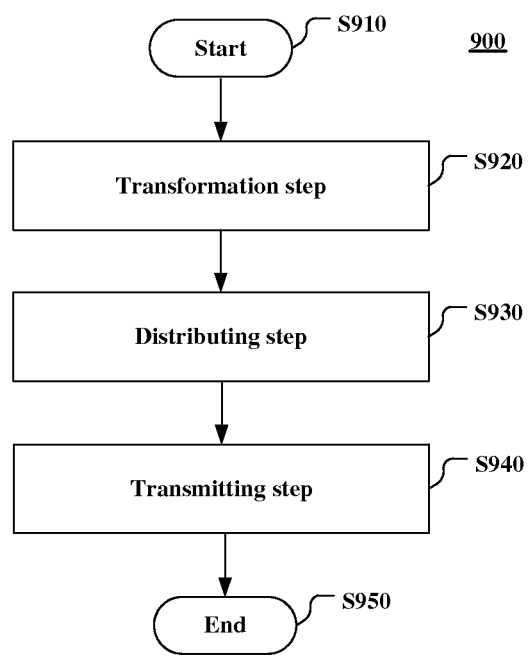
FIG. 9 is a flow chart illustrating an example method of transmitting audio signals according to an embodiment of the present invention.

FIG. 9 is a flow chart illustrating an example method 900 of transmitting audio signals according to an embodiment of the present invention.

As illustrated in FIG. 9, the method 900 starts from step 910. At step 920, transformation is performed on audio signals in units of frame to obtain transformed audio data of each frame, which includes multiple signal components in frequency domain.

At step 930, the signal components of each frame are distributed into multiple adjacent packets to generate each packet in which partial signal components distributed from multiple frames are interleaved.

At step 940, the generated packet is transmitted, for example, over a communication network such as a packet network.

The method 900 ends at step 950.

In an example implementation of step 920, the transformation may comprise modified discrete cosine transformation (MDCT) and the signal components may comprise MDCT coefficients.

In an example implementation of step 930, the signal components of each frame may be distributed into the multiple adjacent packets uniformly.

In a further implementation of step 930, for the signal components of each frame, a half of the signal components indexed by ones of odd numbers and even numbers may be distributed into a first packet, while the other half of the signal components indexed by the other ones of odd numbers and even numbers may be distributed into a subsequent packet that follows the first packet in transmission order.

In an example implementation of step 930, for the signal components of each frame indexed by a sequence number k, the signal components may be distributed into two adjacent packets, so that a packet indexed by k−1 contains a half of the signal components in a frame indexed by k−2 and a half of the signal components in a frame indexed by k−1, and a packet indexed by k contains the other half of the signal components in the frame indexed by k−1 and a half of the signal components in the frame indexed by k.

In an example implementation of step 930, for the signal components of each frame indexed by a sequence number k, the signal components may be distributed into two adjacent packets, so that a packet indexed by k−1 contains a half of the signal components in a frame indexed by k−1 and a half of the signal components in the frame indexed by k, and a packet indexed by k contains the other half of the signal components in the frame indexed by k and a half of the signal components in a frame indexed by k+1.

In an example implementation of step 930, for the signal components of each pair of frame indexed by sequence numbers k−1 and k, the signal components of each frame in the pair may be distributed into two adjacent packets, so that a packet indexed by k−1 contains a half of the signal components in the frame indexed by k−1 and a half of the signal components in the frame indexed by k, and a packet indexed by k contains the other half of the signal components in the frame indexed by k−1 and the other half of the signal components in the frame indexed by k.

In an example implementation of step 930, the signal components include low-frequency components and high-frequency components, and the signal components of each frame may be distributed into the multiple adjacent packets so that the low-frequency components are reserved in a corresponding one among the multiple adjacent packets and the high-frequency components are distributed into the multiple adjacent packets.

In an example implementation of step 930, quantization and encoding are performed before or after the distributing.

Figure 10:
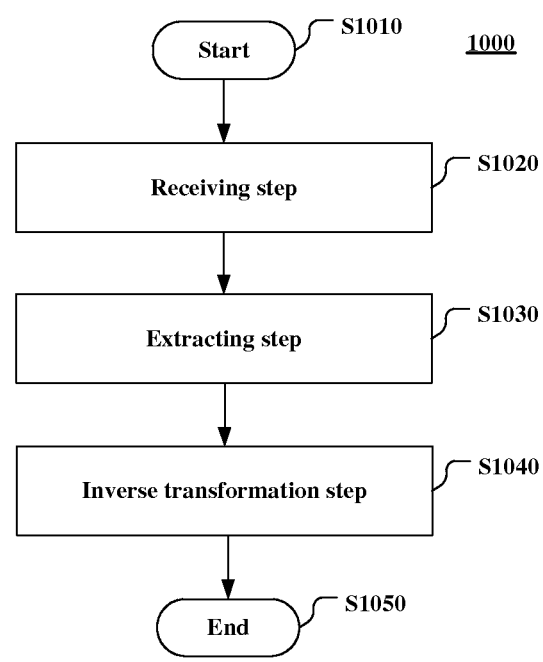
FIG. 10 is a flow chart illustrating an example method of receiving audio signals according to an embodiment of the present invention.

FIG. 10 is a flow chart illustrating an example method 1000 of receiving audio signals according to an embodiment of the present invention, which corresponds to the example method 900 of transmitting audio signals in FIG. 9.

As illustrated in FIG. 10, the method 1000 starts from step 1010. At step 1020, multiple packets into which signal components of a current frame are distributed are received, for example, from a communication network such as a packet network.

At step 1030, the signal components of the current frame are extracted from the received packets.

At step 1040, inverse transformation is performed on the extracted signal components to reconstruct the audio signals of the current frame.

The method 1000 ends at step 1050.

In an example implementation of step 1040, when packet loss occurs in transmission, missing signal components of the current frame may be filled by one of the following ways: filling with zero, interpolation of adjacent signal components in the current frame, interpolation of signal components in adjacent frames, repeating signal components of an available previous frame, or building a statistical model to predict the missing signal components.

In an example implementation of step 1040, in case that the low-frequency components in the current frame are reserved in a corresponding one among the multiple packets at the transmitting side, when the corresponding packet is lost in transmission, the missing low-frequency components are filled with low-frequency components from an available adjacent frame.

In an example implementation of step 1040, audio signals may comprise speech signals; and when packet loss occurs in transmission, it may be determined whether a speech sound in an available adjacent frame is a voiced sound or an unvoiced sound; and if a speech sound in the adjacent frame is determined as a voiced sound, the missing low-frequency components may be filled with low-frequency components from the adjacent frame, otherwise, the missing low-frequency components may be filled with zeros or small values which may be predetermined.

In an example implementation of step 1040, the inverse transformation may comprise inverse modified discrete cosine transformation (MDCT) and the signal components may comprise MDCT coefficients.

In an example implementation of step 1030, decoding and inverse quantization may be performed before or after the extracting.

In the above technical solutions according to example embodiments of the present invention, in case that packet loss occurs in transmission, the audio signals can be recovered with the received partial signal components without consuming additional bandwidth. Therefore, a level of robustness to packet loss can be achieved with little overhead.

Further, it should be noted that, observing that for short-term stationary signals, the signal spectrum remains substantially invariant from block-to-block, the adjacent frames will have similar exponent envelopes, and thus the interleaving does not significantly increase entropy for the perceptual coding. Therefore, the above technical solutions according to example embodiments of the present invention are simple, effective and with little overhead.

Further, as mentioned in the above, the above technical solutions according to example embodiments of the present invention will incur an additional delay at the encoding or decoding side. Therefore the tradeoff between packet loss and latency needs to be considered when using the above technical solutions in a system design. In practice, packet losses are often associated with large jitters in a communication system, which requires a jitter buffer to remove jitters. When there are packets in a jitter buffer whose number is equal to or larger than the interleaving length, the above technical solutions will be able to decode incoming packets without adding additional delay on the top of the system delay caused by a jitter buffer. Thus the above technical solutions may be selected (1) when more latency can be tolerated, such as streaming, one-way voice communication, etc. (2) a jitter buffer is presented at the receiving side and there are packets in the jitter buffer whose number is equal to or larger than the interleaving length.

Figure 11:
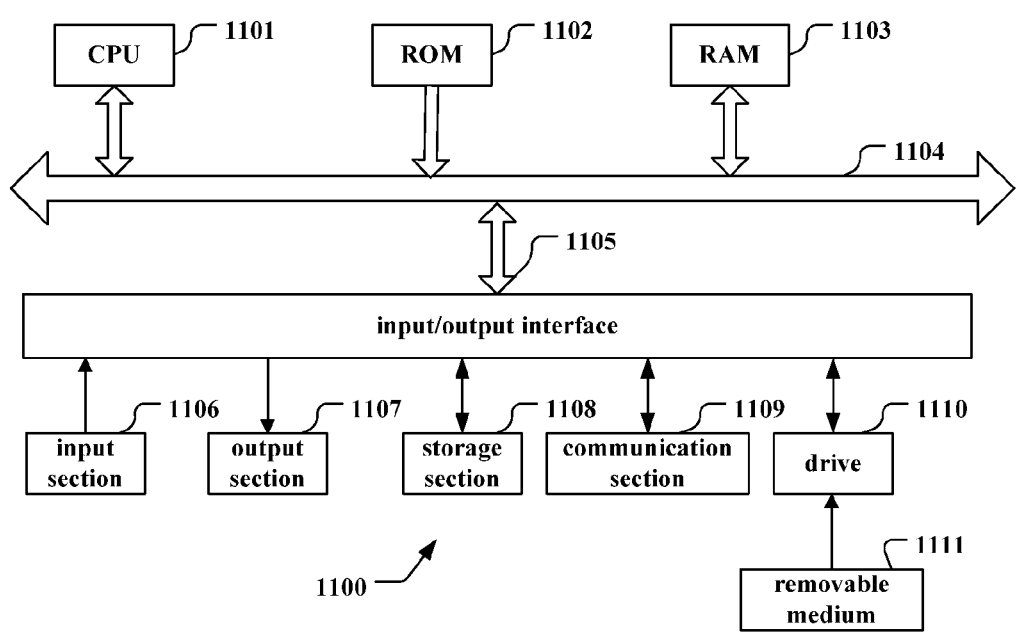
FIG. 11 is a block diagram illustrating an exemplary system for implementing aspects of the present invention.

FIG. 11 is a block diagram illustrating an exemplary system for implementing the aspects of the present invention.

In FIG. 11, a central processing unit (CPU) 1101 performs various processes in accordance with a program stored in a read only memory (ROM) 1102 or a program loaded from a storage section 1108 to a random access memory (RAM) 1103. In the RAM 1103, data required when the CPU 1101 performs the various processes or the like is also stored as required.

The CPU 1101, the ROM 1102 and the RAM 1103 are connected to one another via a bus 1104. An input/output interface 1105 is also connected to the bus 1104.

The following components are connected to the input/output interface 1105: an input section 1106 including a keyboard, a mouse, or the like; an output section 1107 including a display such as a cathode ray tube (CRT), a liquid crystal display (LCD), or the like, and a loudspeaker or the like; the storage section 1108 including a hard disk or the like; and a communication section 1109 including a network interface card such as a LAN card, a modem, or the like. The communication section 1109 performs a communication process via the network such as the internet.

A drive 1110 is also connected to the input/output interface 1105 as required. A removable medium 1111, such as a magnetic disk, an optical disk, a magneto—optical disk, a semiconductor memory, or the like, is mounted on the drive 1110 as required, so that a computer program read therefrom is installed into the storage section 1108 as required.

In the case where the above-described steps and processes are implemented by the software, the program that constitutes the software is installed from the network such as the internet or the storage medium such as the removable medium 1111.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A method of transmitting audio signals, comprising:
performing transformation on the audio signals in units of frame to obtain transformed audio data of each frame, which includes multiple signal components in frequency domain;
distributing the signal components of each frame into multiple adjacent packets to generate each packet in which partial signal components distributed from multiple frames are interleaved; and
transmitting the generated packet.

EE 2. The method according to EE 1, wherein the distributing comprises:
distributing the signal components of each frame into the multiple adjacent packets uniformly.

EE 3. The method according to EE 1 or 2, wherein the distributing comprises:
for the signal components of each frame, distributing a half of the signal components indexed by ones of odd numbers and even numbers into a first packet, and distributing the other half of the signal components indexed by the other ones of odd numbers and even numbers into a subsequent packet that follows the first packet in transmission order.

EE 4. The method according to any one of EEs 1 to 3, wherein the distributing comprises:
for the signal components of each frame indexed by a sequence number k, distributing the signal components into two adjacent packets, so that a packet indexed by k−1 contains a half of the signal components in a frame indexed by k−2 and a half of the signal components in a frame indexed by k−1, and a packet indexed by k contains the other half of the signal components in the frame indexed by k−1 and a half of the signal components in the frame indexed by k.

EE 5. The method according to any one of EEs 1 to 3, wherein the distributing comprises:
for the signal components of each frame indexed by a sequence number k, distributing the signal components into two adjacent packets, so that a packet indexed by k−1 contains a half of the signal components in a frame indexed by k−1 and a half of the signal components in the frame indexed by k, and a packet indexed by k contains the other half of the signal components in the frame indexed by k and a half of the signal components in a frame indexed by k+1.

EE 6. The method according to any one of EEs 1 to 3, wherein the distributing comprises:
for the signal components of each pair of frame indexed by sequence numbers k−1 and k, distributing the signal components of each frame in the pair into two adjacent packets, so that a packet indexed by k−1 contains a half of the signal components in the frame indexed by k−1 and a half of the signal components in the frame indexed by k, and a packet indexed by k contains the other half of the signal components in the frame indexed by k−1 and the other half of the signal components in the frame indexed by k.

EE 7. The method according to EE 1, wherein the signal components include low-frequency components and high-frequency components, and the distributing comprises:
distributing the signal components of each frame into the multiple adjacent packets so that the low-frequency components are reserved in a corresponding one among the multiple adjacent packets and the high-frequency components are distributed into the multiple adjacent packets.

EE 8. The method according to any one of EEs 1 to 7, wherein quantization and encoding are performed before or after the distributing.

EE 9. The method according to any one of EEs 1 to 8, wherein the transformation comprises modified discrete cosine transformation (MDCT) and the signal components comprise MDCT coefficients.

EE 10. A method of receiving audio signals, comprising:
receiving multiple packets into which signal components of a current frame are distributed;
extracting the signal components of the current frame from the received packets; and
performing inverse transformation on the extracted signal components to reconstruct the audio signals of the current frame.

EE 11. The method according to EE 10, wherein when packet loss occurs in transmission, missing signal components of the current frame are filled in the inverse transformation by one of the following ways: filling with zero, interpolation of adjacent signal components in the current frame, interpolation of signal components in adjacent frames, repeating signal components of an available previous frame, or building a statistical model to predict the missing signal components.

EE 12. The method according to EE 10, wherein in case that the low-frequency components in the current frame are reserved in a corresponding one among the multiple packets at a transmitting side, when the corresponding packet is lost in transmission, the missing low-frequency components are filled with low-frequency components from an available adjacent frame.

EE 13. The method according to EE 10, wherein audio signals comprise speech signals; and when packet loss occurs in transmission, it is determined whether a speech sound in an available adjacent frame is a voiced sound or an unvoiced sound; and if a speech sound in the adjacent frame is determined as a voiced sound, the missing low-frequency components are filled with low-frequency components from the adjacent frame, otherwise, the missing low-frequency components are filled with zeros or predetermined small values.

EE 14. The method according to any one of EEs 10 to 13, wherein decoding and inverse quantization are performed before or after the extracting.

EE 15. The method according to any one of EEs 10 to 14, wherein the inverse transformation comprises inverse modified discrete cosine transformation (MDCT) and the signal components comprise MDCT coefficients.

EE 16. An apparatus for transmitting audio signals, comprising:
a transformation unit configured to perform transformation on the audio signals in units of frame to obtain transformed audio data of each frame, which includes multiple signal components in frequency domain;
a distributing unit configured to distribute the signal components of each frame into multiple adjacent packets to generate each packet in which partial signal components distributed from multiple frames are interleaved; and
a transmitting unit configured to transmit the generated packet.

EE 17. The apparatus according to EE 16, wherein the distributing unit is further configured to distribute the signal components of each frame into the multiple adjacent packets uniformly.

EE 18. The apparatus according to EE 16 or 17, wherein the distributing unit is further configured to, for the signal components of each frame, distribute a half of the signal components indexed by ones of odd numbers and even numbers into a first packet, and distribute the other half of the signal components indexed by the other ones of odd numbers and even numbers into a subsequent packet that follows the first packet in transmission order.

EE 19. The apparatus according to any one of EEs 16 to 18, wherein the distributing unit is further configured to, for the signal components of each frame indexed by a sequence number k, distribute the signal components into two adjacent packets, so that a packet indexed by k−1 contains a half of the signal components in a frame indexed by k−2 and a half of the signal components in a frame indexed by k−1, and a packet indexed by k contains the other half of the signal components in the frame indexed by k−1 and a half of the signal components in the frame indexed by k.

EE 20. The apparatus according to any one of EEs 16 to 18, wherein the distributing unit is further configured to, for the signal components of each frame indexed by a sequence number k, distribute the signal components into two adjacent packets, so that a packet indexed by k−1 contains a half of the signal components in a frame indexed by k−1 and a half of the signal components in the frame indexed by k, and a packet indexed by k contains the other half of the signal components in the frame indexed by k and a half of the signal components in a frame indexed by k+1.

EE 21. The apparatus according to any one of EEs 16 to 18, wherein the distributing unit is further configured to, for the signal components of each pair of frame indexed by sequence numbers of k−1 and k, distribute the signal components of each frame in the pair into two adjacent packets, so that a packet indexed by k−1 contains a half of the signal components in the frame indexed by k−1 and a half of the signal components in the frame indexed by k, and a packet indexed by k contains the other half of the signal components in the frame indexed by k−1 and the other half of the signal components in the frame indexed by k.

EE 22. The apparatus according to EE 16, wherein the signal components include low-frequency components and high-frequency components, and the distributing unit is further configured to distribute the signal components of each frame into the multiple adjacent packets so that the low-frequency components are reserved in a corresponding one among the multiple adjacent packets and the high-frequency components are distributed into the multiple adjacent packets.

EE 23. The apparatus according to any one of EEs 16 to 22, wherein the distributing unit is further configured to perform quantization and encoding before or after the distributing.

EE 24. The apparatus according to any one of EEs 16 to 23, wherein the transformation comprises modified discrete cosine transformation (MDCT) and the signal components comprise MDCT coefficients.

EE 25. An apparatus for receiving audio signals, comprising:
a receiving unit configured to receive multiple packets into which signal components of a current frame are distributed;
an extracting unit configured to extract the signal components of the current frame from the received packets; and
an inverse transformation unit configured to perform inverse transformation on the extracted signal components to reconstruct the audio signals of the current frame.

EE 26. The apparatus according to EE 25, wherein the inverse transformation unit is further configured to, when packet loss occurs in transmission, fill missing signal components of the current frame by one of the following ways: filling with zero, interpolation of adjacent signal components in the current frame, interpolation of signal components in adjacent frames, repeating signal components of an available previous frame, or building a statistical model to predict the missing signal components.

EE 27. The apparatus according to EE 25, wherein the inverse transformation unit is further configured to, in case that the low-frequency components in the current frame are reserved in a corresponding one among the multiple packets at a transmitting side, when the corresponding packet is lost in transmission, fill the missing low-frequency components with low-frequency components from an available adjacent frame.

EE 28. The apparatus according to EE 25, wherein audio signals comprise speech signals; and the inverse transformation unit is further configured to, when packet loss occurs in transmission, determine whether a speech sound in an available adjacent frame is a voiced sound or an unvoiced sound; and if a speech sound in the adjacent frame is determined as a voiced sound, fill the missing low-frequency components with low-frequency components from the adjacent frame, otherwise, fill the missing low-frequency components with zeros or predetermined small values.

EE 29. The apparatus according to any one of EEs 25 to 28, wherein the extracting unit is further configured to perform decoding and inverse quantization before or after the extracting.

EE 30. The apparatus according to any one of EEs 25 to 29, wherein the inverse transformation comprises inverse modified discrete cosine transformation (MDCT) and the signal components comprise MDCT coefficients.

EE 31. A program product with machine readable instruction codes stored thereon, which, when being read and executed by a machine, performs a method of transmitting audio signals, wherein the method comprises:
performing transformation on the audio signals in units of frame to obtain transformed audio data of each frame, which includes multiple signal components in frequency domain;
distributing the signal components of each frame into multiple adjacent packets to generate each packet in which partial signal components distributed from multiple frames are interleaved; and
transmitting the generated packet.

EE 32. A storage medium carrying thereon the program product according to EE 31.

EE 33. A program product with machine readable instruction codes stored thereon, which, when being read and executed by a machine, performs a method of receiving audio signals, wherein the method comprises:
receiving multiple packets into which signal components of a current frame are distributed;
extracting the signal components of the current frame from the received packets; and
performing inverse transformation on the extracted signal components to reconstruct the audio signals of the current frame.

EE 34. A storage medium carrying thereon the program product according to EE 33.

We claim:

1. A method of transmitting audio signals, comprising:
performing transformation on the audio signals in units of frame to obtain transformed audio data of each frame, which includes multiple signal components in frequency domain;
distributing the signal components of each frame into multiple adjacent packets to generate each packet in which partial signal components distributed from multiple frames are interleaved; and
transmitting the generated packet, wherein the distributing comprises:
for the signal components of each frame indexed by a sequence number k, distributing the signal components into two adjacent packets, so that a packet indexed by k−1 contains a half of the signal components in a frame indexed by k−2 and a half of the signal components in a frame indexed by k−1, and a packet indexed by k contains the other half of the signal components in the frame indexed by k−1 and a half of the signal components in the frame indexed by k.

2. The method according to claim 1, wherein the distributing comprises:
distributing the signal components of each frame into the multiple adjacent packets uniformly.

3. The method according to claim 2, wherein the distributing comprises:
for the signal components of each frame, distributing a half of the signal components indexed by ones of odd numbers and even numbers into a first packet, and distributing the other half of the signal components indexed by the other ones of odd numbers and even numbers into a subsequent packet that follows the first packet in transmission order.

4. The method according to claim 1, wherein the distributing comprises:
for the signal components of each frame indexed by a sequence number k, distributing the signal components into two adjacent packets, so that a packet indexed by k−1 contains a half of the signal components in a frame indexed by k−1 and a half of the signal components in the frame indexed by k, and a packet indexed by k contains the other half of the signal components in the frame indexed by k and a half of the signal components in a frame indexed by k+1.

5. The method according to claim 1, wherein the distributing comprises:
for the signal components of each pair of frame indexed by sequence numbers k−1 and k, distributing the signal components of each frame in the pair into two adjacent packets, so that a packet indexed by k−1 contains a half of the signal components in the frame indexed by k−1 and a half of the signal components in the frame indexed by k, and a packet indexed by k contains the other half of the signal components in the frame indexed by k−1 and the other half of the signal components in the frame indexed by k.

6. The method according to claim 1, wherein the signal components include low-frequency components and high-frequency components, and the distributing comprises:
distributing the signal components of each frame into the multiple adjacent packets so that the low-frequency components are reserved in a corresponding one among the multiple adjacent packets and the high-frequency components are distributed into the multiple adjacent packets.

7. The method according to claim 1, wherein quantization and encoding are performed before or after the distributing.

8. The method according to claim 1, wherein the transformation comprises modified discrete cosine transformation (MDCT) and the signal components comprise MDCT coefficients.

9. A non-transitory computer-readable medium with instructions stored thereon that when executed by one or more processors perform the method of claim 1.

* * * * *